(No Model.) 2 Sheets—Sheet 1.
J. T. WOODS.
FEEDING BIN AND TROUGH.
No. 378,536. Patented Feb. 28, 1888.
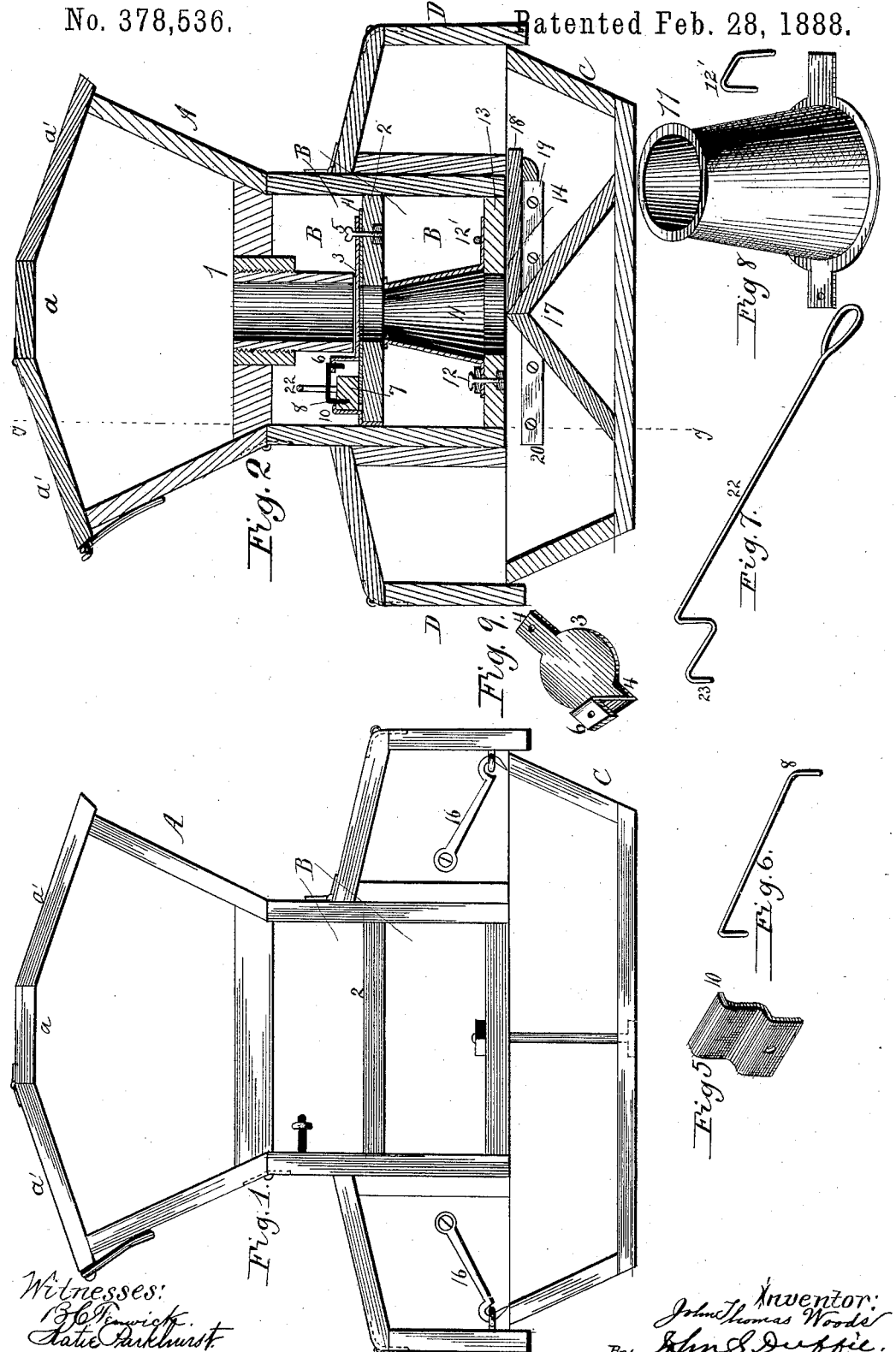
Witnesses:
B. C. Fenwick
Katie Parkhurst
Inventor:
John Thomas Woods
By John S. Duffie,
his Attorney.

(No Model.) 2 Sheets—Sheet 2.
J. T. WOODS.
FEEDING BIN AND TROUGH.
No. 378,536. Patented Feb. 28, 1888.
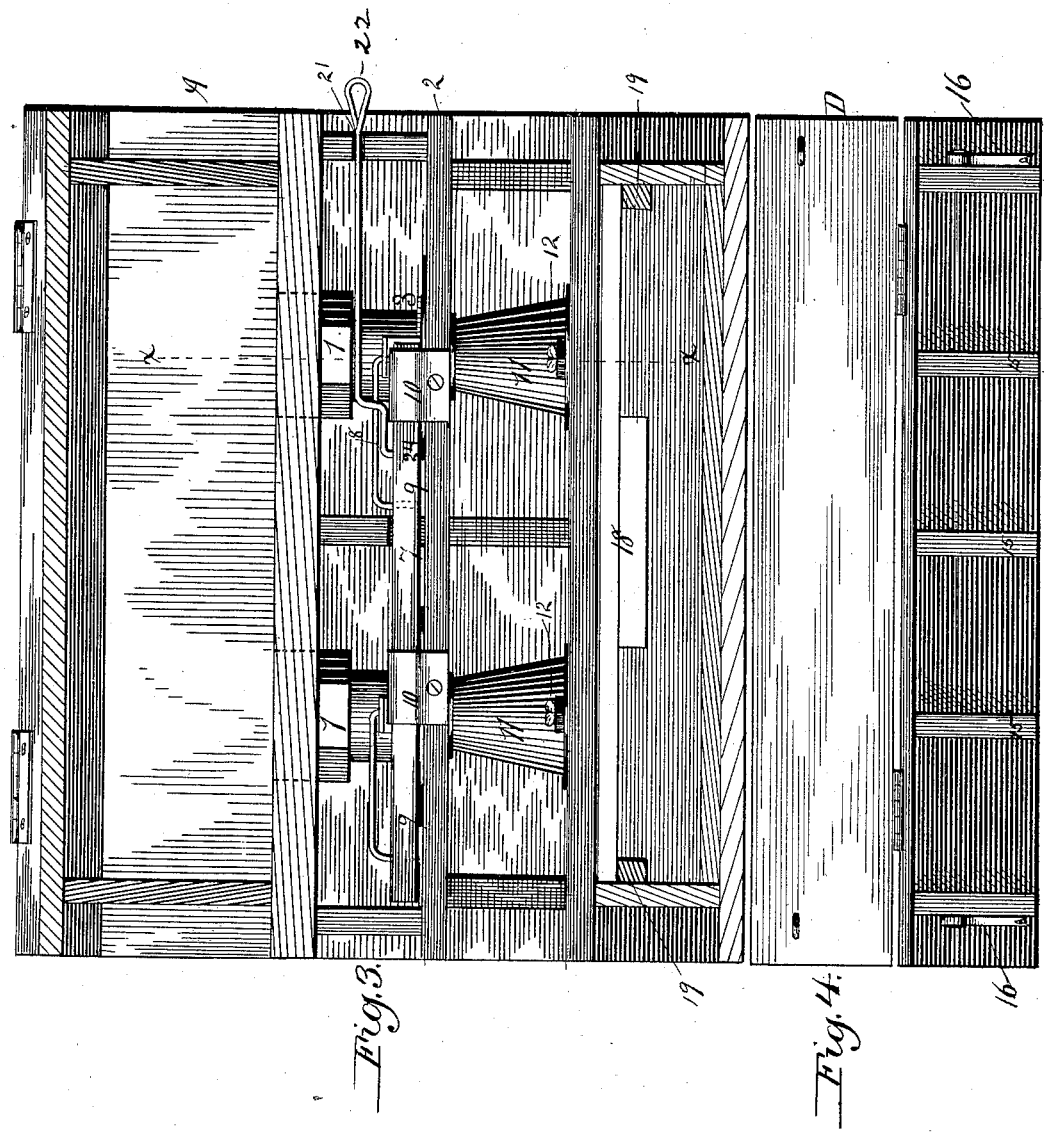

United States Patent Office.

JOHN THOMAS WOODS, OF SUPERIOR, NEBRASKA.

FEEDING BIN AND TROUGH.

SPECIFICATION forming part of Letters Patent No. 378,536, dated February 28, 1888.

Application filed November 19, 1886. Renewed January 4, 1888. Serial No. 259,796. (No model.)

*To all whom it may concern:*

Be it known that I, JOHN THOMAS WOODS, a citizen of the United States, residing at Superior, in the county of Nuckolls and State of Nebraska, have invented certain new and useful Improvements in Feeding Bins and Troughs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is a feeding bin and trough; and it consists in the novel construction and arrangements of its parts, as hereinafter set forth.

In the accompanying drawings, Figure 1 is an end view of my invention. Fig. 2 is a cross-sectional view cut through on a point indicated by the dotted line $x\ x$ in Fig. 3. Fig. 3 is a longitudinal sectional view cut through as indicated by the dotted line $y\ y$ on Fig. 2. Figs. 4, 5, 6, 7, 8, and 9 are detail views.

My invention is described as follows: The feeding bin and trough consists of a bin, A, for holding the food, which is covered by a center piece, $a$, lids $a'$, one or both of which may be hinged to the center piece, $a$, and locked down by any known method, a box, B, for holding the feeding apparatus, and a trough, C, for holding the food, and having partitions 15, which divide and separate the food into feeds.

Extending through the bottom of the bin A are two or more feed-pipes, 1, which are a little larger at the bottom than at the top, so that the food will not choke. Just under the lower ends of these feed-pipes 1 is erected a partition, 2, which is as wide as and extends the full length of the box. Immediately under the lower ends of these feed-pipes 1 are cut-offs 3, which are secured on the bars 4, the pivot end of which is pivoted to the upper face of the said partition 2 by thumb-screws 5 or other suitable device, and the free ends 6 of which are turned up and perforated. One of these devices is under each feeding-pipe, and is used to cut off the feed when desired by sliding the cut-off 3 under the lower ends of said pipes. They are operated by the following device: On the upper face of said partition 2 is placed a perforated sliding bar, 7. In the perforation in the free ends of the cut-off 3 is placed one end of a U-shaped wire, 8, while the other end of the same enters the perforation 9 in the said sliding bar 7. Said sliding bar 7 is held in place by cleats or plates of iron, 10, the upper ends of which are bent over the upper face of said bar to hold it in place, while the lower ends are secured to the said partition 2. In one end of the box B is a perforation, 21, through which a lever, 22, works, the inner end, 23, of which is bent down and enters a perforation, 24, in the sliding bar 7, and when I wish to let the food fall down from the pipes 1, I pull the said lever 22 out. This draws the sliding bar 7 back, which in turn draws the cut-off slides 3 from under the feed-pipes 1. When I wish to cut the food off, I push the said lever 22 in, which throws the cut-off plates 3 under the said feed-pipes 1. The said partition 2 has through it, and immediately under the pipes 1, holes which are large enough to allow the food to pass down, and immediately under said partition and under the perforation in the same are secured the lower feed-pipes, 11, which are larger at their lower ends than at their upper ends, and their upper ends are secured to the lower face of the partition 2 and their lower ends to the upper face of the bottom of the box B by bolts 12 or other suitable means, as staple 12'. Through the bottom 13 of the box B are perforations 14, to allow the food to pass down into the lower box or trough, C.

The trough C is considerably wider than the bin A and box B, so that an animal may have room to feed from the same, and the said trough C extends out some distance from either side of the box B, and is divided into divisions by partitions 15, so that each animal can feed only out of its own division. Each extension of the trough C is protected by a lid, D, which is hinged to the upper face of the box B and fastened down by hooks and eyes 16 or other suitable means.

Immediately under the perforations 14 in the bottom of the box B, running lengthwise of the box and its entire length, is a V-shaped divider, 17, the sharp edge or apex of which runs immediately under the center of the said perforations 14, so that when the feed falls through the feed-pipes it will divide equally, one half falling on one side in the trough C and the other half on the other side in the said trough. The said trough is provided with a cut-off, 18, which extends the entire length thereof, and runs under and fits up against the lower face of the bottom 13 of the box B and its inner edge against the divider 17 at its apex, and is held in place by two cross-beams, 19, one at either end of the bin. This cut-off is for the purpose of throwing all the feed in one side of the trough C when both sides are not to be used, and it may be changed to the other side of the trough, in which case it will be supported by the cross-beams 20, and will throw all the feed to the other side of the trough.

Having described my invention, what I claim as new, and desire to secure by Letters Patent, is—

1. A feeding bin and trough consisting of the bin A, box B, having a perforated partition, 2, therein and a perforated bottom, 13, trough C, the feeding-pipes 1, extending through the bottom of bin A, cut-offs 3, pivoted to the upper face of the partition 2, sliding bar 7, held in place by cleats 10, U-shaped wires 8, one end working in perforations 9 in said sliding bar and the other in the free ends 6 of the cut-offs 3, lever 22, having its inner end bent down and working in the perforations 24 in said bar 7, its other end extending out through the end of the box B, the lower feed-pipes, 11, secured to the partition 2 and the perforated bottom 13, divider 17, running immediately under perforations 14 in the bottom 13, cut-off 18, supported by cross-beams 19 and 20, partitions 15 in the trough C, and the lids D, protecting said trough C, all substantially as shown and described, and for the purposes set forth.

2. In a feeding bin and trough as above described, the combination, with the said trough and the pipes, of the partition 2, perforated sliding bar 7, secured in place on the upper face of the partition by cleats 10, the cut-offs 3, pivoted to the upper face of said partition, U-shaped wire 8, one end working in the perforation of the free end 6 of said cut-off slide, the other end in perforation 9 of the sliding bar 7, and lever 22, its inner end, 23, bent down and working in perforation 24 of said bar 7, substantially as shown and described.

In testimony whereof I affix my signature in presence of two witnesses.

JOHN THOMAS WOODS.

Witnesses:
JOHN W. CUFF,
A. J. McCONAUGHY.